United States Patent
Thetford et al.

(10) Patent No.: US 7,683,120 B2
(45) Date of Patent: Mar. 23, 2010

(54) DISPERSANTS AND COMPOSITIONS THEREOF

(75) Inventors: Dean Thetford, Norden (GB); Neil L. Simpson, Oldham (GB)

(73) Assignee: Lubrizol Limited, Derbyshire (GB)

( * ) Notice: Subject to any disclaimer, the term of this patent is extended or adjusted under 35 U.S.C. 154(b) by 110 days.

(21) Appl. No.: 11/917,235

(22) PCT Filed: Jun. 13, 2006

(86) PCT No.: PCT/US2006/022926

§ 371 (c)(1),
(2), (4) Date: Dec. 12, 2007

(87) PCT Pub. No.: WO2006/138269

PCT Pub. Date: Dec. 28, 2006

(65) Prior Publication Data

US 2008/0207826 A1 Aug. 28, 2008

Related U.S. Application Data

(60) Provisional application No. 60/691,156, filed on Jun. 16, 2005.

(51) Int. Cl.
*C08G 63/60* (2006.01)
*C08G 69/26* (2006.01)

(52) U.S. Cl. .................. 524/606; 524/538; 524/599; 524/607; 524/612

(58) Field of Classification Search ............ 524/538, 524/599, 606, 607, 612
See application file for complete search history.

(56) References Cited

U.S. PATENT DOCUMENTS

| | | | | |
|---|---|---|---|---|
| 3,018,291 A | * | 1/1962 | Anderson et al. | 548/546 |
| 3,749,695 A | * | 7/1973 | de Vries | 508/404 |
| 4,171,959 A | | 10/1979 | Vartanian | |
| 6,403,725 B1 | * | 6/2002 | Huang et al. | 525/326.9 |
| 2005/0090611 A1 | | 4/2005 | Huffer et al. | |

FOREIGN PATENT DOCUMENTS

| | | |
|---|---|---|
| CA | 1009250 A1 | 4/1977 |
| EP | 1579907 A2 | 9/2005 |
| FR | 2166219 A1 | 8/1973 |
| GB | 2054607 A | 2/1981 |
| WO | 01/14433 A1 | 3/2001 |
| WO | 03/029309 A2 | 4/2003 |
| WO | 2004/065430 A1 | 8/2004 |

* cited by examiner

*Primary Examiner*—James Seidleck
*Assistant Examiner*—Marie Reddick
(74) *Attorney, Agent, or Firm*—Samuel B. Laferty; Joe A. Powell; Thoburn T. Dunlap

(57) ABSTRACT

The present invention provides a composition comprising (i) a particulate solid; (ii) an organic medium; and (iii) a salt of a hydrocarbyl-substituted acrylating agent. The invention further provides for the use of the composition in various applications including paints, inks or mill bases.

5 Claims, No Drawings

DISPERSANTS AND COMPOSITIONS THEREOF

CROSS REFERENCE

This application claims priority from PCT Application Serial. No. PCT/US2006/22926 filed on Jun. 13, 2006, which claims the benefit of U.S. Provisional Application No. 60/691,156 filed on Jun. 16, 2005.

FIELD OF INVENTION

The present invention relates to novel compositions comprising a salt of dispersants, a particulate solid and an organic medium. The invention further relates to the use of the dispersants in media, such as inks, mill bases, plastics and paints.

BACKGROUND OF THE INVENTION

Many formulations such as inks, paints, mill bases, and plastics materials require effective dispersants for uniformly distributing a particulate solid in an organic medium. The organic medium may vary from a polar to non-polar organic medium. Dispersants containing terminal basic groups such as poly(lower alkylene)imine chains are well known and are generally prepared by reaction of the polyamine with polyester chains containing terminal acid groups, the reaction results in a mixture of amide and salt forms. However, many of these dispersants have limited performance towards viscosity and stability properties, which when incorporated into printing inks or paints, give the inks and paints with poor flow characteristics. Therefore, there is a need for a dispersant capable of providing acceptable performance towards at least one of flow characteristics, viscosity and stability properties.

U.S. Pat. No. 5,721,358 which discloses a process for copper phthalocyanine production using a dispersant derived from a non-salted succinimide dispersant. The succinimide dispersant is derived from an alkyleneamine and polyisobutylene succinic anhydride.

U.S. Patent Application 2003/0213410 discloses a polymer-modified pigment comprising a polymer with at least one carboxylic group or salt thereof and at least one coupling agent. The polymer includes derivatives of polyamines that have been reacted with an acylating agent such as acetic or succinic anhydride.

GB 1,373,660 discloses polyesteramine dispersants obtainable by reaction of polyhydroxycarboxylic acids with diamines especially alkylenediamines and their salts thereof.

U.S. Pat. No. 5,000,792 discloses polyesteramine dispersants obtainable by reacting 2 parts of polyhydroxycarboxylic acids with 1 part of dialkylenetriamine.

Therefore, it would be advantageous to have a dispersant with acceptable viscosity and stability properties, which when incorporated into printing inks or paints, give the inks and paints with acceptable flow characteristics.

SUMMARY OF THE INVENTION

It has been found that certain dispersants show excellent ability to disperse a particulate solid in a range of organic media, particularly non-polar organic media. Furthermore, some of the dispersants are novel.

Thus, according to the present invention, there is provided a composition comprising (i) a particulate solid; (ii) an organic medium; and (iii) a salt of a hydrocarbyl-substituted acylating agent.

In one embodiment, the invention provides a dispersant comprising a hydrocarbyl substituted carbonate salt of a hydrocarbyl-substituted acylating agent.

In one embodiment, the present invention provides a composition comprising (i) a particulate solid, (ii) an organic medium; and (iii) a compound of Formula (1) and salts thereof:

B—CO-Z-R Formula (1)

wherein

B comprises a hydrophobic alkyl chain, typically based on polyisobutylene with a number average molecular weight of 300-5000 which together with the —CO— group is the residue of a polyisobutylene succinic anhydride; Z is a divalent bridging group which is attached to the carbonyl group through an oxygen or nitrogen atom and can be generally represented by the formula:

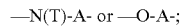

—N(T)-A- or —O-A-;

wherein

T is a hydrogen, or a C1-18 hydrocarbyl radical, or a group represented by A or the residue of the polyisobutylene succinic anhydride;

A is an alkylene or hydroxyalkylene radical containing from 2-6 carbon atoms;

R is a quaternary ammonium group represented by the formula:

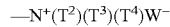

$-N^+(T^2)(T^3)(T^4)W^-$ wherein $T^2$, $T^3$ and $T^4$ are each independently hydrogen, optionally substituted alkyl alkaryl or cycloalkyl groups, or R is a N-oxide functionalized quaternary ammonium group; and $W^-$ is a colourless or coloured anion.

DETAILED DESCRIPTION OF THE INVENTION

The present invention provides a composition as defined above.

In one embodiment, the salt of a hydrocarbyl-substituted acylating agent comprises a succinimide functional group. Typically, the succinimide functional group is derived from an amine or a reactive equivalent thereof.

In one embodiment, the salt of a hydrocarbyl-substituted acylating agent may be a salt of an alkali metal such as lithium, potassium or sodium. Alternatively, the salt may be formed with ammonia, an amine, ammonium cation or quaternary ammonium cation. In one embodiment, the salt of a hydrocarbyl-substituted acylating agent is an ammonium salt. In one embodiment, the salt of a hydrocarbyl-substituted acylating agent comprises an ammonium salt and/or quaternary ammonium salt of a succinimide hydrocarbyl-substituted acylating agent.

In one embodiment, the ammonium salt and/or quaternary ammonium salt of a succinimide hydrocarbyl-substituted acylating agent is a dispersant.

Hydrocarbyl-Substituted Acylating Agent

The hydrocarbyl-substituted acylating agent typically has a hydrocarbyl group with a number average molecular weight in several embodiments ranging from 300 to 5000, 450 to 4000, 500 to 3000 or 550 to 2500. In several embodiments, the hydrocarbyl group has a number average molecular weight of about 550, or about 750, or 950 to 1000, or about 1600 or about 2300.

In one embodiment, the hydrocarbyl group comprises a polymer. Examples of a suitable polymer include a polyolefin or a polyalkylene oxide.

In one embodiment, the polymer may be derived from at least one olefin or combinations thereof of olefins.

In several embodiments, the polymer is derived from an olefin containing 2 to 8 carbon atoms or 3 to 6 carbon atoms. Examples of a suitable olefin include propylene, isobutylene, pentene or hexene. Typically, the polymer is derived from isobutylene to form a polyisobutylene.

In one embodiment, the polymer has a terminal C=C double bond group, i.e., a vinylidene group. Typically, the amount of vinylidene groups present is not important as a succinated polymer (particularly succinated polyisobutylene) may be prepared by a chlorine route or from chlorine-free routes.

The amount of vinylidene group present is typically from at least 2 wt %, or at least 40%, or at least 50%, or at least 60%, or at least 70% of the polymer molecules. Often, the amount of vinylidene group present is about 75%, about 80% or about 85%.

The polymer may be obtained commercially under the tradenames of Glissopal®1000 or Glissopal®2300 (commercially available from BASF), TPC®555, TPC®575 or TPC®595 (commercially available from Texas Petroleum Chemicals).

Acylating Agent

The acylating agent of the invention may be a compound with one or more acid functional groups, such as a carboxylic acid or anhydride thereof. Examples of an acylating agent include an alpha, beta-unsaturated mono- or polycarboxylic acid, anhydride ester or derivative thereof. Examples of an acylating agent include (meth) acrylic acid, methyl (meth) acrylate, maleic acid or anhydride, fumaric acid, itaconic acid or anhydride, or mixtures thereof.

Amine

The amine is known in the art amine and includes a cyclic (aromatic and/or non-aromatic) amine such as a substituted monoamine, a polyamine or mixtures thereof. A person skilled in the art will be aware of suitable amine compounds capable of forming a quaternary ammonium salt.

In one embodiment, the amine has at least one reactive N—H bond (nitrogen to hydrogen bond). The amine may contain one or more primary and secondary amine functional groups. Alternatively, the amine may contain one or more primary and tertiary amine functional groups. Optionally, the amine may also be further substituted with other functional groups, such as a hydroxyl.

The substituted monoamine in one embodiment has 1 to 22 carbon atoms and further substituted with a group capable of reacting with the hydrocarbyl-substituted acylating agent. Typically, the monoamine will contain a secondary or tertiary amine functional group.

The quaternary ammonium cation may be a quaternary ammonium cation or a benzalkonium cation such as a pyridinium cation. The quaternary ammonium cation in one embodiment contains one or two alkyl groups containing from 6 to 20 carbon atoms.

Examples of a suitable amines include N,N-dimethyl-aminopropylamine, N,N-diethyl-aminopropylamine, N,N-dimethyl-aminoethylamine ethylenediamine, 1,2-propylenediamine, 1,3-propylene diamine, the isomeric butylenediamines, pentanediamines, hexanediamines, heptanediamines, diethylenetriamine, dipropylenetriamine, dibutylenetriamine, triethylenetetraamine, tetraethylenepentaamine, pentaethylenehexaamine, hexamethylenetetramine, and bis(hexamethylene) triamine, the diaminobenzenes, the diaminopyridines or mixtures thereof.

Examples of other suitable quaternary ammonium cations include tetraethyl ammonium, N-octadecyl-N,N,N-trimethyl ammonium; N,N-didodecyl-N,N-dimethyl ammonium, N-benzyl-N,N,N-trimethyl ammonium and N-benzyl-N-octadecyl-N,N-dimethyl ammonium cation.

Polyamines in one embodiment include an alkylenediamine or a substituted alkylenediamine, such as, ethylenediamine and N-methylpropylenediamine, polyalkylene polyamines, for instance, tetraethylenepentamine and polyethylene polyamine bottoms, an alkanolamine containing one or more hydroxy groups such as 2-(2-aminoethylamino)ethanol, aminoalkyl substituted heterocyclic compounds such as 1-(3-aminopropyl)imidazole and 4-(3-aminopropyl)morpholine, 1-(2-aminoethyl)piperidine, 3,3-diamino-N-methyl-dipropylamine, 3'3-aminobis(N,N-dimethylpropylamine), condensates of polyamines with polyhydroxy compounds such as condensates of polyethylene polyamines with tris (hydroxymethyl)aminomethane as described in U.S. Pat. No. 5,653,152, or mixtures thereof. In an embodiment, the amine is tetraethylenepentamine.

Other useful types of polyamine mixtures are those resulting from stripping of the above-described polyamine mixtures to leave as residue what is often termed "polyamine bottoms". In general, alkylenepolyamine bottoms may be characterised as having less than two, usually less than 1% (by weight) material boiling below about 200° C. A typical sample of such ethylene polyamine bottoms obtained from the Dow Chemical Company of Freeport, Texas designated "E-100" has a specific gravity at 15.6° C. of 1.0168, a percent nitrogen by weight of 33.15 and a viscosity at 40° C. of 121 centistokes. Gas chromatography analysis of such a sample contains about 0.93% "Light Ends" (most probably DETA), 0.72% TETA, 21.74% tetraethylene pentamine and 76.61% pentaethylenehexamine and higher (by weight). These alkylenepolyamine bottoms include cyclic condensation products such as piperazine and higher analogs of diethylenetriamine or triethylenetetramine.

In one embodiment, the ammonium salt and/or quaternary ammonium salt has an anionic quaternising counterion including halides, such as chloride, iodide or bromide, hydroxides, sulphonates, alkyl sulphates, such as dimethyl sulphate, sultones, phosphates, $C_{1-12}$ alkylphosphates, di $C_{1-12}$ alkylphosphates, borates, $C_{1-12}$ alkylborates, nitrites, nitrates, carbonates, bicarbonates, alkanoates, O,O-di $C_{1-12}$ alkyldithiophosphates or mixtures thereof.

In one embodiment, the quaternising counterion may be derived from dialkyl sulphates such as dimethyl sulphate, N-oxides, sultones such as propane and butane sultone, alkyl or araalkyl halides such as methyl and ethyl chloride, bromide or iodide or benzyl chloride, and a hydrocarbyl (or alkyl) substituted carbonates such as dimethyl or diethyl carbonate.

In one embodiment, the dispersant comprises a hydrocarbyl substituted carbonate salt of a hydrocarbyl-substituted acylating agent.

In other embodiments, the quaternary counterion may be derived from hydrochloric acid, sulphuric acid, acetic acid, propionic acid, formic acid, methanesulphonic acid, benzenesulphonic acid, p-toluenesulphonic acid, benzoic acid, or an organic dyestuff containing at least one sulphonic or carboxylic acid, in particular azo, anthraquinone or phthalocyanine dyestuffs containing at least one sulphonic or carboxylic acid group such as are described in for example the third edition of the Colour Index which was published in 1971.

Examples of a suitable salt of a hydrocarbyl-substituted acylating agent include:

(a) a dispersant as described and claimed in U.S. Pat. No. 4,253,980 and/or U.S. Pat. No. 3,778,371 i.e., a polyisobutylene succinimide ester lactone of a pyridinium salt;

(b) a dispersant as described and claimed in U.S. Pat. No. 4,326,973 and/or U.S. Pat. No. 4,338,206 i.e., a polyisobutylene succinimide of a pyridinium salt; and (c) a dispersant as described and claimed in U.S. Pat. No. 5,254,138 i.e., a reaction product of a polyalkyl succinic anhydride with a polyamino hydroxyalkyl quaternary ammonium salt.

Methods of preparing ammonium salt and/or quaternary ammonium salt of a hydrocarbyl-substituted acylating agent in (a), (b) and (c) are also disclosed in the Examples of each patent.

Other examples of a suitable quaternary ammonium salts of succinimides include polyisobutenyl (335) —N,N,N-trimethyl-propa-1,3-diamine succinimide quaternary ammonium iodide, polyisobutenyl (335)-N-methyl-N-(3-aminopropyl) morpholino succinimide quaternary ammonium iodide, polyisobutenyl (1200)-N,N,N-trimethylpropa-1,3-diamino succinimide quaternary ammonium iodide, polyisobutenyl (850)-N,N,N-trimethyletha-1,2-diamino succinimide quaternary ammonium iodide, polypropenyl (700)-N,N,N-triethyl-propa-1,3-diamino succinimide quaternary ammonium bromide, polyisobutenyl (335)-N-methyl-N-(3-aminopropyl) piperazino succinimide quaternary ammonium iodide and polypropenyl (800)-N-methyl-N-(2-aminoethyl)piperazino succinimide quaternary ammonium chloride. Methods of preparing the iodide quaternary ammonium salts are described in U.S. Pat. No. 4,171,959.

In one embodiment, Formula (1) above, is the dispersant. From Formula (1), examples of the radicals represented by A include ethylene, propylene, tetramethylene, hexamethylene and 2-hydroxytrimethylene.

From Formula (1), examples of the radicals represented by T include methyl, ethyl, n-propyl, n-butyl, hexyl, octyl and octadecyl.

From Formula (1), examples of the radicals represented by $T^2$, $T^3$ and $T^4$ include alkyl such as methyl, ethyl, n-propyl, n-butyl, hexyl, octyl and octadecyl, hydroxyl lower alkyl such as 2-hydroxyethyl, and cyclohexyl.

From Formula (1), examples of acids to form salts with the amine group or which contain the anion $W^-$ may be any inorganic acid or colourless or coloured organic acid, such as hydrochloric acid, sulphuric acid, dimethylsulphate, acetic acid, propionic acid, formic acid, methanesulphonic acid, benzenesulphonic acid, p-toluenesulphonic acid, benzoic acid, or an organic dyestuff containing at least one sulphonic or carboxylic acid, in particular azo, anthraquinone or phthalocyanine dyestuffs containing at least one sulphonic or carboxylic acid group such as are described in, for example, the third edition of the Colour Index which was published in 1971.

The particulate solid present in the composition may be any inorganic or organic solid material which is substantially insoluble in the organic medium. In one embodiment, the particulate solid is a pigment.

Examples of suitable solids are pigments for solvent inks; pigments, extenders and fillers for paints and plastics materials; disperse dyes; optical brightening agents and textile auxiliaries for solvent dyebaths, inks and other solvent application systems; solids for oil-based and inverse-emulsion drilling muds; dirt and solid particles in dry cleaning fluids; particulate ceramic materials; magnetic materials and magnetic recording media; fibres such as glass, steel, carbon and boron for composite materials; and biocides, agrochemicals and pharmaceuticals which are applied as dispersions in organic media.

In one embodiment, the solid is an organic pigment from any of the recognised classes of pigments described, for example, in the Third Edition of the Colour Index (1971) and subsequent revisions of, and supplements thereto, under the chapter headed "Pigments". Examples of organic pigments are those from the azo, disazo, condensed azo, thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Carbon black, although strictly inorganic, behaves more like an organic pigment in its dispersing properties. In one embodiment, the organic pigments are phthalocyanines, especially copper phthalocyanines, monoazos, disazos, indanthrones, anthranthrones, quinacridones and carbon blacks.

Inorganic solids include: extenders and fillers such as talc, kaolin, silica, barytes and chalk; particulate ceramic materials such as alumina, silica, zirconia, titania, silicon nitride, boron nitride, silicon carbide, boron carbide, mixed silicon-aluminium nitrides and metal titanates; particulate magnetic materials such as the magnetic oxides of transition metals, especially iron and chromium, e.g., gamma-$Fe_2O_3$, $Fe_3O_4$, and cobalt-doped iron oxides, calcium oxide, ferrites, especially barium ferrites; and metal particles, especially metallic iron, nickel, cobalt, copper and alloys thereof.

Other useful solid materials include agrochemicals such as the fungicides flutriafen, carbendazim, chlorothalonil and mancozeb.

The organic medium present in the composition of the invention in one embodiment is a plastics material and in another embodiment an organic liquid. The organic liquid may be a non-polar or a polar organic liquid.

Examples of organic liquids, which may be used as polar organic liquids are film-forming resins such as are suitable for the preparation of inks, paints and chips for use in various applications such as paints and inks. Examples of such resins include polyamides, such as Versamid™ and Wolfamid™, and cellulose ethers, such as ethyl cellulose and ethyl hydroxyethyl cellulose, nitrocellulose and cellulose acetate butyrate resins, including mixtures thereof. Examples of paint resins include short oil alkyd/melamine-formaldehyde or long oil alkyd.

In one embodiment, non-polar organic liquids are compounds containing aliphatic groups, aromatic groups or mixtures thereof. The non-polar organic liquids include non-halogenated aromatic hydrocarbons (e.g., toluene and xylene), halogenated aromatic hydrocarbons (e.g., chlorobenzene, dichlorobenzene, chlorotoluene), non-halogenated aliphatic hydrocarbons (e.g., linear and branched aliphatic hydrocarbons containing six or more carbon atoms both fully and partially saturated), halogenated aliphatic hydrocarbons (e.g., dichloromethane, carbon tetrachloride, chloroform, trichloroethane) and natural non-polar organics (e.g., vegetable oil, sunflower oil, linseed oil, terpenes and glycerides).

In one embodiment, the organic liquid comprises at least 0.1% by weight, or 1% by weight or more of a polar organic liquid based on the total organic liquid. In one embodiment, the organic liquid is free of water.

The plastics material may be a thermoset resin or a thermoplastic resin. The thermosetting resins useful in this invention include resins which undergo a chemical reaction when heated, catalysed, or subject to UV radiation and become relatively infusible. Typical reactions in thermosetting resins include oxidation or unsaturated double bonds, reactions involving epoxy/amine, epoxy/carbonyl, epoxy/hydroxyl, polyisocyanate/hydroxy, amino resin/hydroxy moieties, free radical reactions or polyacrylate, cationic polymerization or epoxy resins and vinyl ether, condensation or silanol.

In one embodiment, thermoplastic resins include polyolefins, polyesters, polyamides, polycarbonates, polyurethanes, polystyrenics, poly(meth)acrylates, celluloses and cellulose derivatives. Said compositions may be prepared in a number of ways but melt mixing and dry solid blending are typical methods.

If desired, the compositions may contain other ingredients, for example, resins (where these do not already constitute the organic medium), binders, fluidising agents anti-sedimentation agents, plasticisers, surfactants, anti-foamers, rheology modifiers, leveling agents, gloss modifiers and preservatives.

The compositions typically contain from 1 to 95% by weight of the particulate solid, the precise quantity depending on the nature of the solid and the quantity depending on the nature of the solid and the relative densities of the solid and the polar organic liquid. For example, a composition in which the solid is an organic material, such as an organic pigment, in one embodiment contains from 15 to 60% by weight of the solid whereas a composition in which the solid is an inorganic material, such as an inorganic pigment, filler or extender, in one embodiment contains from 40 to 90% by weight of the solid based on the total weight of composition.

The composition may be prepared by any of the conventional methods known for preparing dispersions. Thus, the solid, the organic medium and the dispersant may be mixed in any order, the mixture then being subjected to a mechanical treatment to reduce the particles of the solid to an appropriate size, for example, by ball milling, bead milling, gravel milling or plastic milling until the dispersion is formed. Alternatively, the solid may be treated to reduce its particle size independently or in admixture with either of the organic medium or the dispersant, the other ingredient or ingredients then being added and the mixture being agitated to provide the composition.

The composition of the present invention is particularly suited to liquid dispersions. In one embodiment, such dispersion compositions comprise:
  (a) from 0.5 to 30 parts of a particulate solid;
  (b) from 0.5 to 30 parts of a compound of Formula (1) and/or the salt of a hydrocarbyl-substituted acylating agent; and
  (c) from 40 to 99 parts of an organic liquid; wherein all parts are by weight and the amounts (a)+(b)+(c)=100.

In one embodiment, component a) comprises from 0.5 to 30 parts of a pigment and such dispersions are useful as (liquid) inks, paints and mill bases.

If a composition is required comprising a particulate solid and a dispersant of Formula (1) and/or the salt of a hydrocarbyl-substituted acylating agent in dry form, the organic liquid is typically volatile so that it may be readily removed from the particulate solid by a simple separation means such as evaporation. In one embodiment, the composition comprises the organic liquid.

If the dry composition consists essentially of the dispersant of Formula (1) and/or the salt of a hydrocarbyl-substituted acylating agent and the particulate solid, it typically contains at least 0.2%, at least 0.5% or at least 1.0% dispersant of Formula (1) and/or the salt of a hydrocarbyl-substituted acylating agent based on weight of the particulate solid. In one embodiment, the dry composition contains not greater than 100%, not greater than 50%, not greater than 20%, or not greater than 10% by weight of dispersant of Formula (1) and/or the salt of a hydrocarbyl-substituted acylating agent based on the weight of the particulate solid.

As disclosed hereinbefore, the compositions of the invention are suitable for preparing mill bases wherein the particulate solid is milled in an organic liquid in the presence of a compound for Formula (1) and/or the salt of a hydrocarbyl-substituted acylating agent.

Thus, according to a still further aspect of the invention, there is provided a mill base comprising a particulate solid, an organic liquid and a compound of Formula (1) and/or the salt of a hydrocarbyl-substituted acylating agent.

Typically, the mill base contains from 20 to 70% by weight particulate solid based on the total weight of the mill base. In one embodiment, the particulate solid is not less than 10 or not less than 20% by weight of the mill base. Such mill bases may optionally contain a binder added either before or after milling.

The binder is a polymeric material capable of binding the composition on volatilisation of the organic liquid.

The amount of dispersant in the mill base is dependent on the amount of particulate solid but is typically from 0.5 to 5% by weight of the mill base.

Dispersions and mill bases made from the composition of the invention are particularly suitable for use in coatings and paints, especially high solids paints; inks, especially flexographic, gravure and screen inks including inks for non-contact printing especially in the case of Drop-on-Demand printers wherein the ink is typically ejected from an orifice by a thermal or piezoelectric means; non-aqueous ceramic processes, especially tape-coating, doctor-blade, extrusion and injection moulding type processes; composites, cosmetics, adhesives and plastics materials.

The invention is further illustrated by the following examples wherein all references to amounts are in parts by weight unless indicated to the contrary.

EXAMPLES

Intermediate 1: Synthesis of Succinimide with 3-Dimethylaminopropylamine

Polyisobutylene succinic anhydride (203.7 g) with a number average molecular weight of 950-1000 (and an average of 1.3 maleic anhydride's per polyisobutylene chain) is stirred at 100° C. under a slow stream of nitrogen before 3-Dimethylaminopropylamine (also referred to as DMAPA) (31.22 g) is added slowly dropwise and the mixture was stirred at 100° C. for 3 hours. The mixture is then stirred at 185° C. for 3 hours under a nitrogen atmosphere, excess DMAPA is removed during this stage. A brown viscous liquid (216 g) is obtained. Base equivalent of the product is measured as 1093 mg. This is Intermediate 1.

Intermediates 2 to 14

Intermediates 2 to 14 are prepared by the same process as Intermediate 1, except the polyisobutylene succinic anhydride is characterised as follows:

| Intermediate | Number average molecular weight of Polyisobutylene on PIBSA | Process Preparation of PIBSA | PIBSA to Maleic Anhydride Ratio |
|---|---|---|---|
| 2 | 550 | DA | 1:1.2 |
| 3 | 1000 | DA | 1:1.6 |

-continued

| Intermediate | Number average molecular weight of Polyisobutylene on PIBSA | Process Preparation of PIBSA | PIBSA to Maleic Anhydride Ratio |
|---|---|---|---|
| 4 | 1550 | DA | 1:1.3 |
| 5 | 1000 | DA | 1:1.3 |
| 6 | 1000 | CL | 1:1.6 |
| 7 | 1550 | DA | 1:2.24 |
| 8 | 2300 | DA | 1:1.2 |
| 9 | 2000 | CL | 1:1.6 |
| 10 | 2000 | CL | 1:1.7 |
| 11 | 2000 | CL | 1:1.9 |
| 12 | 1100 | DA | 1:1.2 |
| 13 | 1400 | DA | 1:1.2 |
| 14 | 1600 | DA | 1:1.2 |

Footnote:

DA PIBSA is prepared by direct alkylation process or an "ene" reaction. The "ene" reaction is summarised in Maleic Anhydride, pages, 147-148, Edited by B. C. Trivedi and B. C. Culbertson and Published by Plenum Press in 1982.

CL defines a PIBSA prepared by a Diels Alder process as described in U.S. Pat. Nos. 6,440,905, or 6,165,235, or 3,172,892, or 4,234,435.

Intermediates 15 to 21

Intermediates 15 to 21 are prepared in the same process as Intermediate 1, except for the differences highlighted as follows:

| Intermediate | Number average molecular weight of Polyisobutylene on PIBSA | Process Preparation of PIBSA | Amine |
|---|---|---|---|
| 15 | 1100 | DA | 3,3'-Iminobis(dipropylamine) |
| 16 | 1400 | DA | 3,3'-Iminobis(dipropylamine) |
| 17 | 1600 | DA | 3,3'-Iminobis(dipropylamine) |
| 18 | 1100 | DA | N,N,N'-Trimethylethylenediamine |
| 19 | 1400 | DA | N,N,N'-Trimethylethylenediamine |
| 20 | 1600 | DA | N,N,N'-Trimethylethylenediamine |
| 21 | 1000 | DA 1:1.3 | Tetraethylenepentamine |

Dispersant 1

Intermediate 1 (100 g) is stirred at 90° C. under a slow stream of nitrogen in toluene (110.96 g) for 15 minutes before addition of dimethyl sulphate (10.96 g). The resulting mixture is then stirred at 90° C. for another 4 hours to give a brown liquid (220 g). This is Dispersant 1.

Dispersants 2 to 11

Dispersants 2 to 11 are prepared by the same process as described for Dispersant 1, except Intermediates 2 to 11 have been used respectively.

Comparative Example 1 is mill base prepared in the absence of dispersant.

Dispersant 12

A 500 ml flange flask is charged with Intermediate 1 (200 g, 1 equivalent). The contents are stirred and warmed to 90° C. Benzyl chloride (13.5 g 0.11 mol, 0.95 equivalents) is added drop wise over 35 minutes and the mixture stirred for 70 hours. The resulting product is a brown viscous liquid with a yield of 204 g (96%).

Dispersant 13

A 600 ml autoclave is charged with Intermediate 1 (200 g, 1 equivalent), dimethyl carbonate (19.91 g, 0.22 mol, 2 equivalents) and methanol (35.56 g, 1.11 mol, 10 equivalents). The vessel is purged with nitrogen three times and the contents heated to 140° C. for 20 hours at 145 psi. The contents are then cooled and the excess dimethyl carbonate and methanol removed by vacuum distillation. The resulting product is a brown liquid with a yield of 246 g (97%).

Dispersant 14

A 50 ml flask is charged with Intermediate 1 (10 g, 1 equivalent) and toluene (11.02 g). The contents are stirred and warmed to 90° C. 1,3-Propanesultone (1.02 g 0.0083 mol, 0.95 equivalents) is added dropwise over 35 minutes and the mixture stirred for 1 hour. The resulting product is an amber liquid with a yield of 22 g (96%).

Dispersants 15 to 24

Dispersants 15 to 24 are prepared by the same process as described for Dispersant 1, except Intermediates 12 to 21 have been used respectively.

Dispersant 25

Dispersant 25 is prepared by pre-mixing 516.5 g of a product prepared in a similar way as Intermediate 1 with 192.7 g of methanol, 27.4 g of acetic acid and 109.8 g of styrene oxide in a vessel. The contents of the vessel are refluxed at 70° C. for 4 hours. The product is heated to 100° C. for methanol distillation using Dean Stark equipment followed removal of excess styrene oxide. The resulting product is cooled to ambient.

Preparation of Mill Bases

A series of magenta mill bases are prepared utilising Dispersants 1 to 24 and Comparative Example 1. The mill bases are prepared by dissolving a dispersant 1 to 11 (0.38 g) in a solvent mixture of 6.47 g toluene. Glass beads (3 mm, 17 parts) and Monastral Blue BG (ex Heubach, Pigment Blue 15.1 parts), 0.15 g of Solsperse®5000 (a fluidising agent) are added and the mixture was shaken on a horizontal shaker for 16 hours. The resulting dispersions were then assessed for fluidity using an arbitrary scale of A to E (good to bad). The milling grades obtained for Dispersant 2 to 11 are shown below in Table 2. Comparative Example 1 has a milling grade of E.

TABLE 2

| Examples | Toluene |
|---|---|
| 2 | C |
| 3 | B |
| 4 | B |
| 5 | B |
| 6 | C |
| 7 | B |
| 8 | A/B |
| 9 | C/D |
| 10 | C |
| 11 | C |
| 12 | A/B |
| 13 | B |
| 14 | B |
| 15 | A/B |
| 16 | A/B |
| 17 | A/B |

TABLE 2-continued

| Examples | Toluene |
|----------|---------|
| 18 | B/C |
| 19 | B |
| 20 | B/C |
| 21 | C |
| 22 | B/C |
| 23 | B |
| 24 | C |
| Control | E |

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character.

Examples of Hydrocarbyl Groups Include (i) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring);

(ii) substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulfoxy);

(iii) hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, or no more than one, non-hydrocarbon substituent will be present for every ten carbon atoms in the hydrocarbyl group; typically, there will be no non-hydrocarbon substituents in the hydrocarbyl group.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements.

Although, only a few embodiments of the invention have been described above, it should be appreciated that many modifications can be made without departing from the spirit and scope of the invention. All such modifications are intended to be included in the present invention, which is to be limited only by the following claims.

What is claimed is:

1. A composition comprising (i) a particulate solid, wherein the particulate solid is a pigment, (ii) an organic medium, wherein the organic medium is an organic liquid or a plastics material; and (iii) a compound of Formula (1) and salts thereof:

$$B\text{—}CO\text{-}Z\text{-}R \quad \text{Formula (1)}$$

wherein

B comprises a hydrophobic alkyl chain, based on polyisobutylene with a number average molecular weight of 300-5000 which together with the —CO— group is the residue of a polyisobutylene succinic anhydride;

Z is a divalent bridging group which is attached to the carbonyl group through an oxygen or nitrogen atom and represented by the formula:

—N(T)-A- or —O-A-;

wherein

T is a hydrogen, or a C1-18 hydrocarbyl radical, or a group represented by A or the residue of the polyisobutylene succinic anhydride;

A is an alkylene or hydroxyalkylene radical containing from 2-6 carbon atoms;

R is a quaternary ammonium group represented by the formula:

$$-N^+(T^2)(T^3)(T^4)W^-$$

wherein $T^2$, $T^3$ and $T^4$ are each independently hydrogen, optionally substituted alkyl alkaryl or cycloalkyl groups, or R is a N-oxide functionalized quaternary ammonium group; and $W^-$ is a colourless or coloured anion.

2. The composition of claim 1 wherein a salt of the quaternary ammonium group has an anionic quaternising counterion selected from the group consisting of halides, hydroxides, sulphonates, alkyl sulphates, sultones, phosphates, $C_{1-12}$ alkylphosphates, di $C_{1-12}$ alkylphosphates, borates, $C_{1-12}$ alkylborates, nitrites, nitrates, carbonates, bicarbonates, alkanoates, O,O-di $C_{1-12}$ alkyldihtiophosphates and mixtures thereof.

3. The composition as claimed in claim 1 wherein the organic liquid comprises at least 0.1% by weight of a polar organic liquid based on the total organic liquid.

4. A paint or ink comprising the composition of claim 1.

5. A mill base comprising the composition of claim 1.

* * * * *